United States Patent
Bhagwat et al.

(10) Patent No.: US 9,740,769 B2
(45) Date of Patent: Aug. 22, 2017

(54) INTERPRETING AND DISTINGUISHING LACK OF AN ANSWER IN A QUESTION ANSWERING SYSTEM

(71) Applicant: International Business Machines Corporation, Armonk, NY (US)

(72) Inventors: Anand B. Bhagwat, Pune (IN); John P. Bufe, III, Washington, DC (US); Timothy P. Winkler, Clinton, MA (US)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 14/334,493

(22) Filed: Jul. 17, 2014

(65) Prior Publication Data
US 2016/0019293 A1 Jan. 21, 2016

(51) Int. Cl.
*G06F 17/30* (2006.01)

(52) U.S. Cl.
CPC .... *G06F 17/30684* (2013.01); *G06F 17/3053* (2013.01); *G06F 17/30554* (2013.01); *G06F 17/30654* (2013.01); *G06F 17/30696* (2013.01)

(58) Field of Classification Search
CPC ........... G06F 17/3089; G06F 17/30861; G06F 17/30398; G06F 17/30401; G06F 17/3064; G06F 17/30672; G06F 17/30867; G06F 17/30979
USPC .................................................. 705/1.1–912
See application file for complete search history.

(56) References Cited

U.S. PATENT DOCUMENTS

| | | |
|---|---|---|
| 6,718,519 B1 | 4/2004 | Taieb |
| 6,813,747 B1 | 11/2004 | Taieb |
| 7,031,002 B1 | 4/2006 | Taieb |
| 7,707,257 B2 | 4/2010 | Taieb et al. |
| 8,122,342 B2 | 2/2012 | Karle et al. |
| 9,063,975 B2 | 6/2015 | Isensee et al. |
| 9,230,009 B2 | 1/2016 | Alkov et al. |
| 9,280,908 B2 | 3/2016 | Isensee et al. |

(Continued)

FOREIGN PATENT DOCUMENTS

| | | |
|---|---|---|
| WO | WO2009/143395 A1 | 11/2009 |
| WO | WO2011/126458 A1 | 10/2011 |

OTHER PUBLICATIONS

List of IBM Patents or Patent Applications Treated as Related (Appendix P), 1 page.

(Continued)

*Primary Examiner* — Michelle Owyang
(74) *Attorney, Agent, or Firm* — Stephen R. Tkacs; Stephen J. Walder, Jr.; Diana R. Gerhardt (57) ABSTRACT

A mechanism is provided in a computing system for interpreting and distinguishing a lack of an answer to an input question. The mechanism receives an input question from a user. The mechanism generates one or more hypotheses based on a corpus of source information. The mechanism injects a no-answer response into the one or more hypotheses to form a plurality of candidate answers. The mechanism ranks the plurality of candidate answers based on evidence scoring and confidence scoring to form a candidate answer ranking. Responsive to determining the no-answer response is the top candidate answer in the candidate answer ranking, the mechanism presents the no-answer response to the user.

20 Claims, 4 Drawing Sheets

(56) References Cited

U.S. PATENT DOCUMENTS

| | | | |
|---|---|---|---|
| 9,286,153 B2 | 3/2016 | Giffels et al. | |
| 9,401,881 B2 | 7/2016 | Isensee et al. | |
| 9,471,601 B2 | 10/2016 | Ahuja et al. | |
| 9,495,387 B2 | 11/2016 | Ahuja et al. | |
| 9,519,477 B2 | 12/2016 | Champlin-Scharff et al. | |
| 2004/0194141 A1* | 9/2004 | Sanders | G06F 17/30817 725/53 |
| 2006/0287907 A1 | 12/2006 | Kim | |
| 2007/0136246 A1* | 6/2007 | Stenchikova | G06F 17/279 |
| 2009/0287678 A1 | 11/2009 | Brown et al. | |
| 2011/0066587 A1 | 3/2011 | Ferrucci et al. | |
| 2011/0125734 A1 | 5/2011 | Duboue et al. | |
| 2012/0078837 A1* | 3/2012 | Bagchi | A61B 5/00 706/52 |
| 2013/0007055 A1 | 1/2013 | Brown et al. | |
| 2013/0017524 A1 | 1/2013 | Barborak et al. | |
| 2013/0018652 A1 | 1/2013 | Ferrucci et al. | |
| 2013/0066886 A1 | 3/2013 | Bagchi et al. | |
| 2013/0282704 A1* | 10/2013 | Pantel | G06F 17/30395 707/723 |
| 2014/0072947 A1 | 3/2014 | Boguraev et al. | |
| 2014/0344261 A1* | 11/2014 | Navta | G06F 17/30864 707/723 |
| 2015/0302097 A1* | 10/2015 | Focacci | G06F 17/30705 707/723 |

OTHER PUBLICATIONS

"Method of Computing Relevancy Score in a Question and Answering System", Disclosed Anonymously, www.ip.com, IPCOM000222407D, Oct. 2, 2012, 4 pages.

"Scoring terms in a question", IBM Corporation, www.ip.com, IPCOM000013933D, Jun. 19, 2003, 2 pages.

High, Rob, "The Era of Cognitive Systems: An Inside Look at IBM Watson and How it Works", IBM Corporation, Redbooks, Dec. 12, 2012, 16 pages.

Hoeks, John C. et al., "Questions Left Unanswered: How the Brain Responds to Missing Information", PLOS ONE, www.plosone.org, vol. 8, Issue 10, Oct. 2013, 9 pages.

Yuan, Michael J., "Watson and healtchare", IBM Corporation, developerWorks, http://www.ibm.com/developerworks/industry/library/ind-watson/, Apr. 12, 2011, pp. 1-14.

List of IBM Patents or Patent Applications Treated as Related (Appendix P) dated Mar. 7, 2016, 2 pages.

Funabiki, Nobuo et al., "An Extension of Fill-in-the-blank Problem Function in Java Programming Learning Assistant System", IEEE Region 10 Humanitarian Technology Conference, Aug. 26-29, 2013, pp. 85-90.

Hayakawa, Tadafumi et al., "Management of Multimedia Data for Streaming on a Distributed e-Learning System", IEEE, 2012 26th International Conference on Advanced Information Networking and Applications Workshops, Mar. 2012, pp. 1282-1285.

Kim, Yeongjun et al., "Smartphone Response System using Twitter to Enable Effective Interaction and Improve Engagement in Large Classrooms", IEEE, Transactions on Education, vol. 58, May 2015, 2 pages.

Yadav, Arun K. et al., "Sentence Generation from a Bag of Words Using N-gram Model", IEEE International Conference on Advanced Communications, Control and Computing Technologies (ICACCCT), May 2014, pp. 1771-1776.

* cited by examiner

INTERPRETING AND DISTINGUISHING LACK OF AN ANSWER IN A QUESTION ANSWERING SYSTEM

BACKGROUND

The present application relates generally to an improved data processing apparatus and method and more specifically to mechanisms for interpreting and distinguishing lack of an answer in a question answering system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems, which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypotheses based on the decomposed question and results of a primary search of answer sources, performs hypothesis and evidence scoring based on a retrieval of evidence from evidence sources, performs synthesis of the one or more hypotheses, and based on trained models, performs a final merging and ranking to output an answer to the input question along with a confidence measure.

Various United States patent application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method is provided in a question answering system for interpreting and distinguishing a lack of an answer to an input question. The method comprises receiving an input question from a user. The method comprises generating one or more hypotheses based on a corpus of source information. The method further comprises injecting a no-answer response into the one or more hypotheses to form a plurality of candidate answers. The method further comprises ranking the plurality of candidate answers based on evidence scoring and confidence scoring to form a candidate answer ranking. The method further comprises presenting the no-answer response to the user responsive to determining the no-answer response is the top candidate answer in the candidate answer ranking.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism to distinguish the lack of an answer in a question answering system. When a question answering (QA) system does not return an answer, the result simply means that all candidate answers did not have enough evidence to improve a corresponding confidence above a predetermined threshold or no candidate answers are generated at all. In an open domain, one might expect a QA system to respond with "NO ANSWER" in some way to well over 50% of questions. Current systems either choose to show the low confidence answers or reply with a message inferring that no information is found. However, there are various reasons why a question answering system can and should respond with a "NO ANSWER" output to the user, and failing to differentiate and interpret these reasons for a user withholds important information.

There are several potential reasons for not having an answer in a QA system. For example, "Bail" questions are questions that may leave no possible way to understand the question or to retrieve any valuable result. If the question is incomprehensible or completely grammatically incoherent, the question falls into this category. For instance, the question "Bat got?" or "How how call and who" are questions for which a QA system cannot provide a valuable result. This category is also used for types of questions that a particular system is not expected to answer, such as personal questions like "Who is my best friend?"

As another example, "Unanswerable" questions are questions that are at least somewhat discernible, but nothing meets all the requirements or presuppositions made by the question. For example, "Who is the prime minister of the United States" has no answer because there is not a position titled "prime minister" for the United States. As another example, "What is the synonym for volleyball?" simply has no result because there are no terms that are synonyms with "volleyball."

"No Corpus" questions are questions that actually have an answer, but the answer is not within the available sources for the system. If the system is trained solely on a given source of information and there is a question that is not covered by the given source of information, then the QA system will not provide a correct answer. For example, if the system is trained on medical journals and there is a question about the cost of a particular model of high-end laptop, there will be no correct answer in the system.

"Not Confident" questions are well-formed questions with a correct answer in the source documents, but the QA system does not find enough evidence to support a confidence score that exceeds the threshold for an acceptable correct answer.

The illustrative embodiments provide a QA system that differentiates these four cases when an answer is not present. The illustrative embodiments allow the QA system to tailor the response appropriately and provide deeper insight to the user about the question. The feedback allows the user to modify the approach, thus leading to more effective usage of the system and higher user satisfaction.

A "mechanism," as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure or method for executing the functions, or a combination of the above.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

Figure 1:
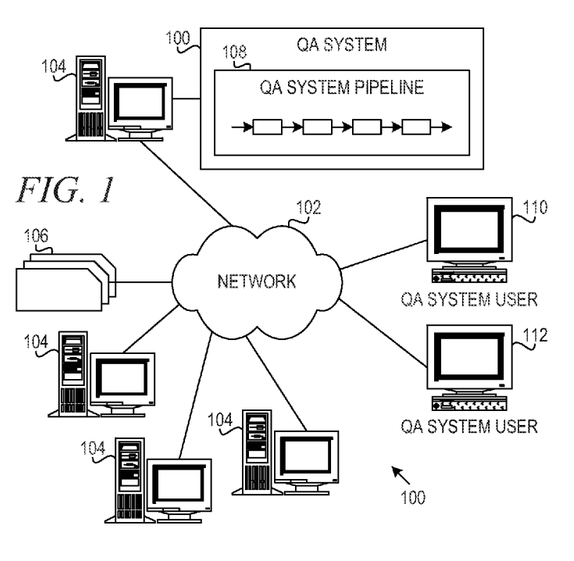
FIG. 1 depicts a schematic diagram of one illustrative embodiment of a question/answer creation (QA) system in a computer network.
Figure 2:
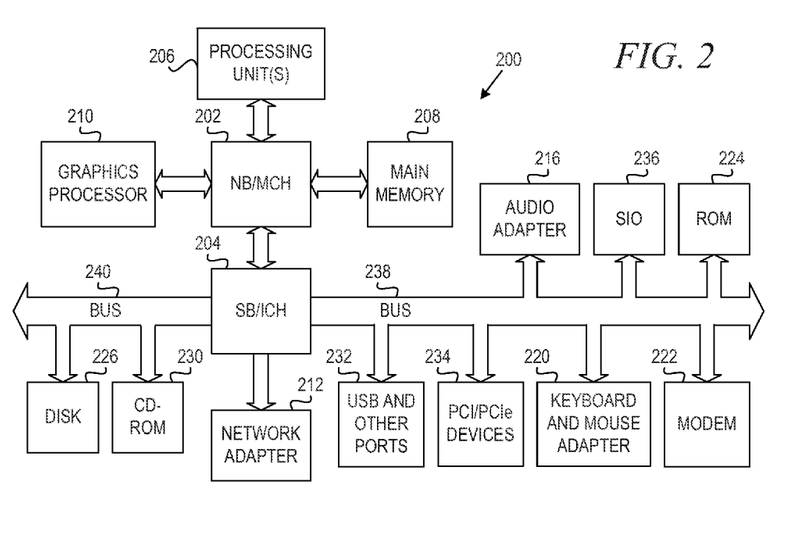
FIG. 2 is a block diagram of an example data processing system in which aspects of the illustrative embodiments may be implemented.
Figure 3:
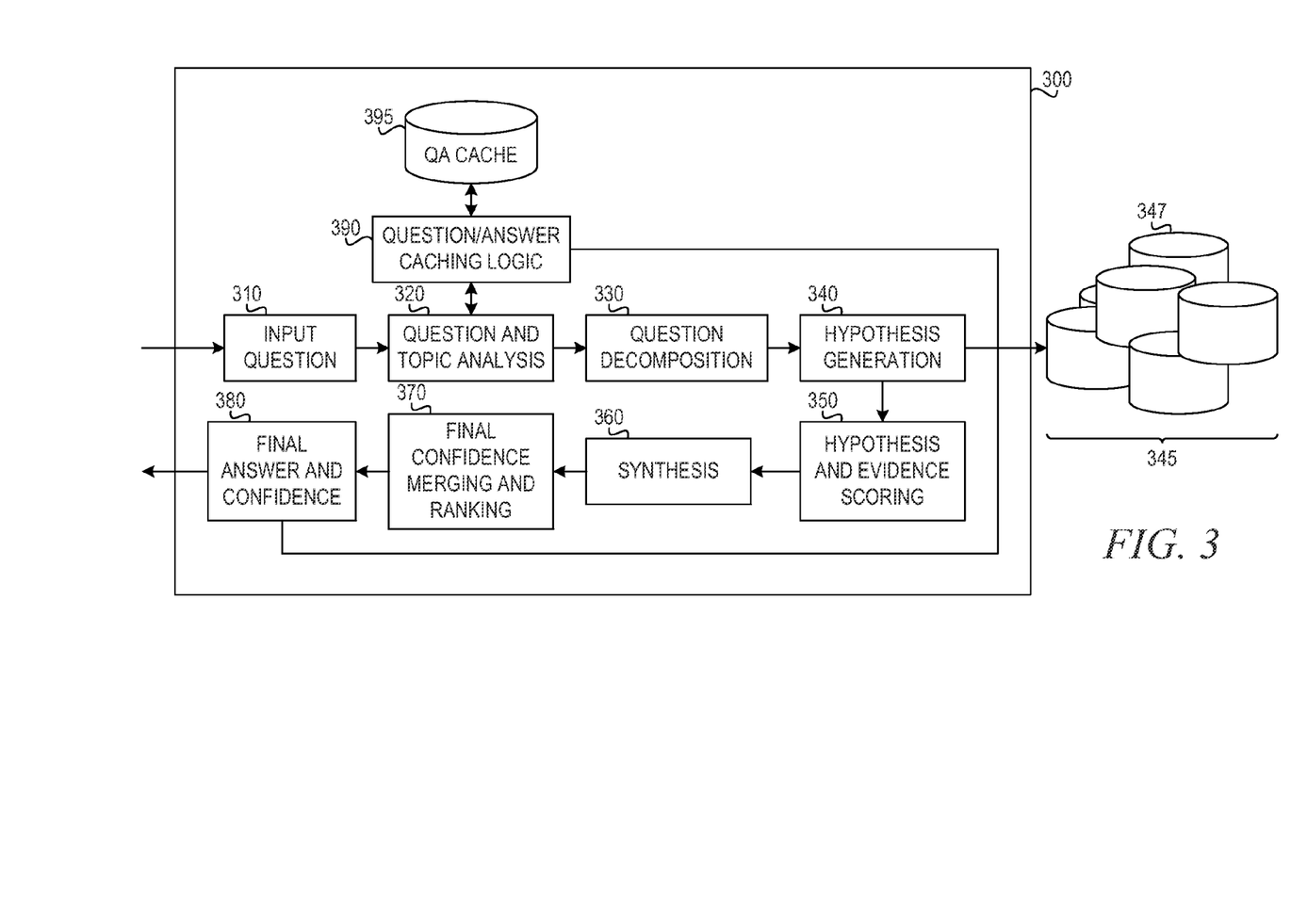
FIG. 3 illustrates a QA system pipeline for processing an input question in accordance with one illustrative embodiment.

FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to automatically generating testing/training questions and answers by performing pattern based analysis and natural language processing techniques on the given corpus for quick domain adaptation.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e., candidate answers.

Content creators, such as article authors, electronic document creators, web page authors, document database creators, and the like, determine use cases for products, solutions, and services described in such content before writing their content. Consequently, the content creators may know what questions the content is intended to answer in a particular topic addressed by the content. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify these question-and-answer attributes of the content.

Operating on such content, the QA system generates answers for input questions using a plurality of intensive analysis mechanisms, which evaluate the content to identify the most probable answers, i.e., candidate answers, for the input question. The illustrative embodiments leverage the work already done by the QA system to automatically generate testing/training questions and answers by performing pattern based analysis and natural language processing techniques on the given corpus for quick domain adaptation.

FIG. 1 depicts a schematic diagram of one illustrative embodiment of a question/answer creation (QA) system 100 in a computer network 102. One example of a question/ answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enable question/answer (QA) generation functionality for one or more QA system users via their respective computing devices 110, 112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 is routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as pad of a corpus of data with the QA system 100. The document includes any file, text, article, or source of data for use in the QA system 100. QA system users access the QA system 100 via a network connection or an Internet connection to the network 102, and input questions to the QA system 100 to be answered by the content in the corpus of data 106. In one embodiment, the questions are formed using natural language. The QA system 100 interprets the question and provide a response to the QA system user, e.g., QA system user 110, containing one or more answers to the question. In some embodiments, the QA system 100 provides a response to users in a ranked list of candidate answers.

The QA system 100 implements a QA system pipeline 108, which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. The IBM Watson™ QA system receives an input question, which it then parses to extract the major features of the question, which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms look at the matching of terms and synonyms within the language of the input question and the found portions of the corpus of data. Other reasoning algorithms took at temporal or spatial features in the language, white others evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model is then used to summarize a level of confidence that the IBM Watson™ QA system has regarding the evidence that the potential response, i.e., candidate answer, is inferred by the question. This process is repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "IBM Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240, PCI/PCIe devices include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An Object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile or optical disk drives and the like, may be used in addition to or in place of the hardware depicted in FIGS. 1 and 2. Also, the processes of the illustrative embodiments may be applied to a multiprocessor data processing system, other than the SNIP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NIT) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a Person with which the question is associated, "closest" may be identified as a word indicative of proximity or relationship, and "advisors" may be indicative of a noun or other language topic.

The identified major features are then used during the question decomposition stage 330 to decompose the question into one or more queries to be applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345.

There may be different corpora 347 defined for different collections of documents based on various criteria depending upon the particular implementation. For example, different corpora may be established for different topics, subject matter categories, sources of information, or the like. As one example, a first corpus is associated with healthcare documents while a second corpus is associated with financial documents. Alternatively, one corpus comprises documents published by the U.S. Department of Energy while another corpus comprises IBM Redbooks documents. Any collection of content having some similar attribute is considered to be a corpus 347 within the corpora 345.

As used herein, a "domain" is a technical, professional, or academic field having a corresponding corpus or source of information. For instance, one domain is a healthcare domain where a corresponding corpus for the domain includes healthcare documents and another domain is a financial domain where a corresponding corpus for the financial domain is a collection of financial documents.

The queries are applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus are then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs, which indicates a measure of relevance of the individual portions of the corpus of data/information extracted by application of the queries as well as a measure of the correctness of the corresponding hypothesis, i.e., a measure of confidence in the hypothesis.

In the synthesis stage 360, the many relevance scores generated by the various reasoning algorithms are synthesized into confidence scores for the various hypotheses. This process involves applying weights to the various scores, where the weights have been determined through training of the statistical model employed by the QA system and/or dynamically updated, as described hereafter. The weighted scores are processed in accordance with a statistical model generated through training of the QA system that identifies a manner by which these scores are combined to generate a confidence score or measure for the individual hypotheses or candidate answers. This confidence score or measure summarizes the level of confidence that the QA system has about the evidence that the candidate answer is inferred by the input question, i.e., that the candidate answer is the correct answer for the input question.

The resulting confidence scores or measures are processed by a final confidence merging and ranking stage 370. It compares the confidence scores and measures, compares them against predetermined thresholds, or performs any other analysis on the confidence scores to determine which hypotheses/candidate answers are the most likely to be the answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question.

After stage 380, or as part of stage 380, the set of candidate answers is output via a graphical user interface, which provides the user with tools for collaborating with the QA system to review, evaluate, and modify the listing of candidate answers and the evidence associated with these candidate answers that is evaluated by the QA system. That is, at stage 390, the graphical user interface engine not only receives the final ranked listing of candidate answers generated by the QA system pipeline 300, but also receives the underlying evidence information for each of the candidate answers from the hypothesis and evidence scoring stage 350, and uses this information to generate a graphical user interface outputting the ranked listing of candidate answers and an output of the selected portions of the corpus of data/information that supports, and/or detracts, from the candidate answers being the correct answer for the input question, referred to hereafter as the "evidence passages." Stage 390 may also cache candidate answers and evidence in QA cache 395 to more quickly provide answers and supporting evidence for recently or frequently asked questions.

In previous implementations, the QA system assumes all users are expert users. This assumption holds in many use cases that are practitioner-facing, such as in-clinic medical support systems, municipal debt quality analysis, insurance company policy review, etc. However, this assumption may prove to be inappropriate for customer-facing applications and other uses in the education or training space.

The illustrative embodiments utilize a finding from tutorial and dialog systems that calibrating system output to the user's expertise level leads to better system success. Success is measured in terms of higher learning gains achieved, higher user satisfaction, and increased user engagement and enjoyment. However, prior implementations rely on hand-crafted resources in order to tailor system behaviors. For example, a tutorial system may hand-code three different phrasings of a question to be presented to the student based on his current level of beginner/intermediate/advanced. Also, prior implementations tend to rely on user-specific attributes pulled from each other's interaction with the system to assess the user's expertise level. In many tutorial situations, the student's expertise level is known and input by the instructor. Other more sophisticated models infer the user's expertise level based on some aspect of their interaction with the current system, such as the number of times the user has used the system or how fast the user makes progress toward a goal.

The illustrative embodiments provide a mechanism for driving differential system behavior in a more automated way through supervised learning of an expertise model built from passively collected human-to-human interactions. An advantage of this model is that it is broadly applicable to any domain for which question and answer collections can be harvested. Also, the mechanism assesses the expertise level based on a similarity measure between a current user and examples in the harvested corpus. Therefore, the system does not need to have a lot of interaction with a particular user in order to gauge expertise level.

In accordance with an illustrative embodiment, QA system pipeline 300 inserts "NO ANSWER" as a candidate answer variant to the QA system for each question. Each annotator/feature created gives some weight to or takes some weight away from the "NO ANSWER" candidate answer. For example, if one expects to find all synonyms in a specific resource and the system receives a question "What is a synonym for volleyball?" the system submits a feature that is heavily weighted toward the "NO ANSWER" candidate answer. The lack of evidence provided for any particular candidate is evidence in favor of "NO ANSWER."

Figure 4:
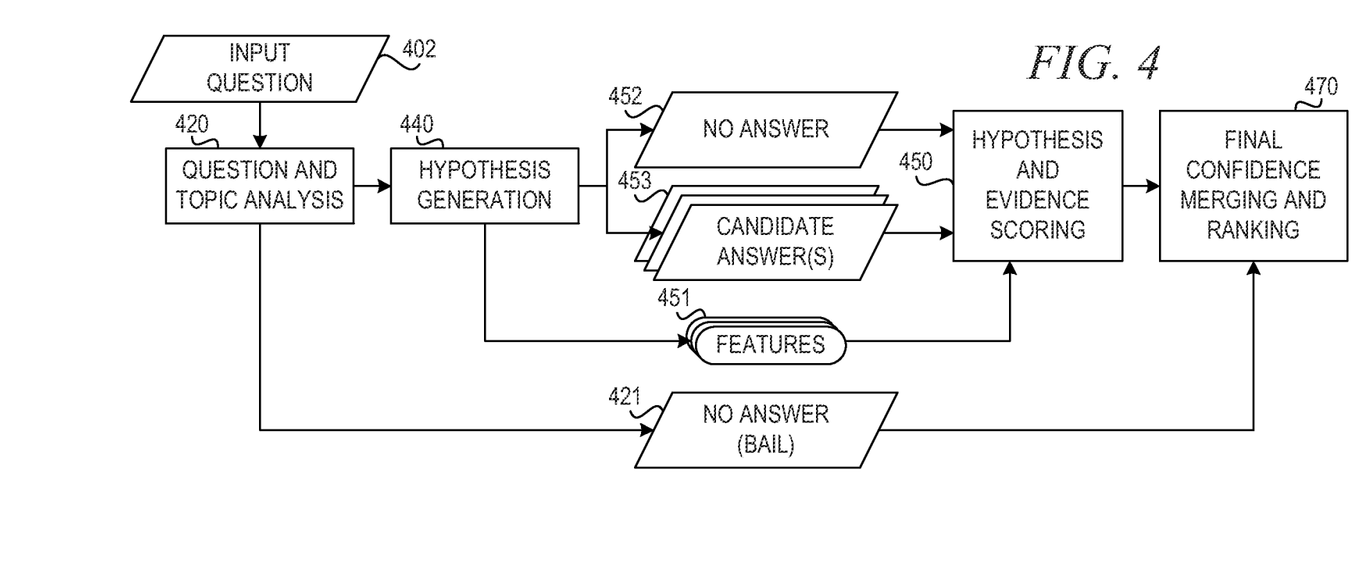
FIG. 4 is a block diagram illustrating a mechanism for distinguishing the lack of an answer in a question answering system in accordance with an illustrative embodiment.

FIG. 4 is a block diagram illustrating a mechanism for distinguishing the lack of an answer in a question answering system in accordance with an illustrative embodiment. The QA system receives input question 402, which is presented in a natural language format. Question and topic analysis stage 420 parses input question 402 using natural language processing (NLP) techniques to extract major features from the input question, classify the major features according to types, e.g., names, dates, or any of a plethora of other defined topics.

In the depicted embodiment, question and topic analysis stage 420 determines whether input question 402 is a "Bail" question. If the NLP techniques fail to arrive at any meaningful question topic or grammatical structure, then question and topic analysis 420 detects that input question 402 is a "Bail" question. In one example embodiment, question classification can use parse scores, n-grams, and stop word lists to create a machine learning model to determine that input question 402 is a "Bail" question. If question and topic analysis 420 detects that input question 402 is a "Bail" question, then question and topic analysis 420 generates "NO ANSWER (BAIL)" 421 and provides "NO ANSWER" to final confidence merging and ranking 470.

If question and topic analysis stage 420 can classify major features from the features to arrive at a comprehensible grammatical structure and a meaningful question topic, then hypothesis generation stage 440 generates hypotheses for answering input question 402. These hypotheses are also referred to herein as "candidate answers" 453 for the input question. For any input question, there may be hundreds of hypotheses or candidate answers 453 generated that need to be evaluated. In accordance with the illustrative embodiment, hypothesis generation stage 440 also injects "NO ANSWER" 452 as a candidate answer variant.

Hypothesis generation 440 also generates features 451, which support the candidate answers, including "NO ANSWER" 452 and candidate answers 453. Some of features 451 may give weight to "NO ANSWER" as the correct answer, while others of features 451 may give weight to one or more of candidate answers 453, thus taking weight away from "NO ANSWER" as the correct answer.

Hypothesis and evidence scoring stage 450 performs deep analysis and comparison of the language of input question 402 and the language of each hypothesis or "candidate answer." Hypothesis and evidence scoring stage 450 performs evidence scoring to evaluate the likelihood that each particular hypothesis 452, 453 is a correct answer for input question 402. As mentioned above, this may involve using a plurality of reasoning algorithms, each performing a separate type of analysis of the language of the input question and/or content of the corpus that provides evidence in support of or not, of the hypothesis. Each reasoning algorithm generates a score based on the analysis it performs, which indicates a measure of relevance of the individual portions of the corpus of data/information extracted by application of the queries as well as a measure of the correctness of the corresponding hypothesis, i.e., a measure of confidence in the hypothesis.

Final confidence merging and ranking 470 processes the resulting confidence scores or measures. Final confidence merging and ranking 470 compares the confidence scores and measures, compares them against predetermined thresholds, or performs any other analysis on the confidence scores to determine which hypotheses/candidate answers are the most likely to be the answer to the input question. Final confidence merging and ranking 470 ranks hypotheses/candidate answers according to these comparisons to generate a ranked listing of candidate answers.

In final confidence merging and ranking stage 470 determines that "NO ANSWER" is the top answer, then the mechanism of the illustrative embodiment differentiates between "No Corpus" questions and "Unanswerable" questions. First, the mechanism determines if the corpus has the n-grams and named entities that are present in input question 402. Using named entity detection on both the corpus and the question will arrive at a list of entities and their frequencies in both. If all entities from the question are present in the corpus above a predetermined frequency, then there is strong evidence that input question 402 is a. "Unanswerable" question. Conversely, if the entities from the question are not present in the corpus above the predetermined frequency, then it is more likely that input question 402 is a "No Corpus" question. Second, if a question is looking for a specific value and all other relevant values are present, it would seem that "Unanswerable" is more appropriate. In the example of the question "Who is the prime minister of the United States?" if the corpus has many political positions and the people holding them in the United States, yet there is no entry for "prime minister," then the mechanism concludes that "Unanswerable" is correct, especially if there is confirmation that the corpus has information about "prime minister" for other countries. If the corpus does not contain information about any other political positions in the United States, then it is likely that the "No Corpus" is appropriate Annotation engines in the pipeline, such as annotation engines associated with hypothesis generation stage 440, generate features for the above determinations, and the mechanism includes a model for distinguishing between these two cases.

If "NO ANSWER" is not the top candidate in final confidence merging and ranking stage 470, and no other candidate answer reaches the desired confidence threshold to be output as a high-confidence, correct answer, then the mechanism generates a "NO ANSWER (Not Confident)" result.

In all of the above instances, the system replies with "NO ANSWER" in some form. Appropriate responses to each might be the following:

1. "Bail": I cannot answer this type of question. Please ask about something else or rephrase the question.
2. "Unanswerable": There is no answer to this question, because . . . (if possible, provide explanation and evidence for why the question cannot be answered).

3. "No Corpus": The information you are searching for is not currently in my sources . . . (if possible, provide alternate source of information).

4. "Not Confident": I am uncertain of the answer. It could be: <low confidence answer>. Try rewording your question or being more specific.

Thus, the system does not simply provide "NO ANSWER" as the result, but differentiates between various categories of "NO ANSWER" results. The system also provides reasoning, evidence, or suggestions, if possible. For "Unanswerable" questions, providing reasoning and evidence allows the user to rephrase the question, such as by replacing "prime minister" with "president" in the above example. For "No Corpus" questions, providing information that particular terms are not found in the corpus allows the user to correct the terms in the question or to ask the question to a QA system trained with a different corpus of source information. For "Not Confident" questions, providing the best answer allows the user to accept the low confidence answer to analyze the question to determine the problem.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. Anon-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of Hocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
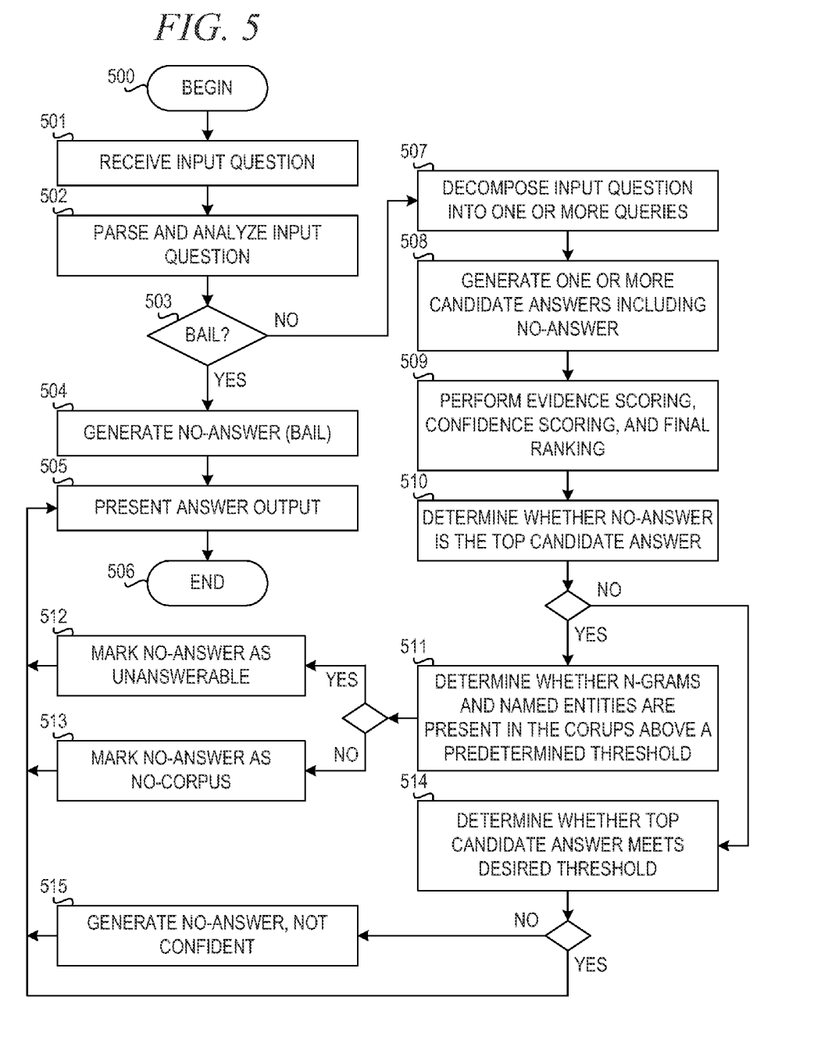
FIG. 5 is a flowchart illustrating operation of a mechanism for distinguishing the lack of an answer in a question answering system in accordance with an illustrative embodiment.

FIG. 5 is a flowchart illustrating operation of a mechanism for distinguishing the lack of an answer in a question answering system in accordance with an illustrative embodiment. Operation begins (block 500), and the mechanism receives an input question (block 501). The mechanism parses and analyzes the input question (block 502). The mechanism then determines whether the question is a "Bail" question (block 503). The mechanism determines the question is a "Bail" question if the input question incomprehensible, grammatically incoherent, or completely unsupported by the system. If the system determines the input question is a "Bail" question, then the system generates a "NO ANSWER (Bail)" response (block 504). The mechanism then presents the answer output (block 505), and operation ends (block 506).

If the mechanism determines the input question is not a "Bail" question in block 503, the mechanism decomposes the input question into one or more queries (block 507). The mechanism then generates one or more candidate answers including a "NO ANSWER" response (block 508). The mechanism then performs evidence scoring, confidence scoring, and final ranking (block 509). The mechanism determines whether the "NO ANSWER" response is the top candidate answer (block 510). If the "NO ANSWER" response is the top candidate answer, then the mechanism determines whether n-grams and named entities from the input question are present in the corpus above a predetermined threshold (block 511). If the n-grams and named entities from the input question are present in the corpus above the predetermined threshold, then the mechanism marks the "NO ANSWER" response as "Unanswerable" (block 512). On the other hand, if the n-grams and named entities from the input question are not present in the corpus in block 511, then the mechanism marks the "NO ANSWER" response as "No Corpus" (block 513). After marking the "NO ANSWER" response in block 512 or 513, operation proceeds to block 505 to present the answer output, and operation ends (block 506).

Returning to block 510, if the mechanism determines that "NO ANSWER" is not the top answer, the mechanism determines whether the top candidate answer meets the desired threshold indicating the candidate answer is a correct answer (block 514). If the top candidate answer does not meet the desired threshold, then the mechanism generates a "NO ANSWER" response and marks the response as "Not Confident" (block 515). Thereafter, the mechanism presents the answer output (block 505), and operation ends (block 506).

If the mechanism determines that the top candidate answer does meet the desired threshold in block 514, then operation proceeds to block 505 to present the answer output. Thereafter, operation ends (block 506).

As mentioned above, the mechanism presents the answer output in block 505 with additional information to differentiate the various causes for having no answer. The mechanism presents evidence, explanation, or suggestions to guide the user to more effective and enjoyable use of the system.

Thus, the illustrative embodiments provide a mechanism for interpreting and distinguishing the lack of an answer in a question answering (QA) system. Early in the QA system pipeline, the mechanism determines whether an input question is a "Bail" question that is incomprehensible, grammatically incoherent, or unsupported by the system. The QA system pipeline injects a "NO ANSWER" response into the candidate answers. The various stages of the QA system pipeline generate features that give weight to or take weight from the "NO ANSWER" candidate. If the top candidate answer is the "NO ANSWER" response or the top candidate answer does not meet the desired threshold for a correct answer, then the system distinguishes the type of "NO ANSWER" response and provides appropriate feedback to the user.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a computing system, for interpreting and distinguishing a lack of an answer to an input question, the method comprising:
   receiving an input question from a user;
   generating one or more hypotheses based on a corpus of source information;
   injecting a no-answer response into the one or more hypotheses to form a plurality of candidate answers, wherein the no-answer response is a candidate answer variant representing an absence of an answer;

generating a plurality of features that support the plurality of candidate answers;
performing evidence scoring and confidence scoring on each of the plurality of candidate answers based on the plurality of features to generate a confidence score for each of the plurality of candidate answers including the no-answer response;
ranking the plurality of candidate answers, including the no-answer response, based on the evidence scoring and the confidence scoring to form a candidate answer ranking; and
responsive to determining the no-answer response has a highest rank in the candidate answer ranking, presenting the no-answer response to the user.

2. The method of claim 1, further comprising:
parsing and analyzing the input question;
responsive to parsing and analyzing the input question resulting in a determination that the input question is incomprehensible, grammatically incoherent, or unsupported by the computing system, generating the no-answer response indicating the question is a bail question; and
presenting the no-answer response to the user.

3. The method of claim 1, further comprising:
responsive to determining the no-answer response has the highest rank in the candidate answer ranking, determining whether n-grams and named entities in the input question are present in the corpus of source information above a predetermined frequency threshold; and
responsive to determining the n-grams and named entities in the input question are present in the corpus of source information above the predetermined frequency threshold, marking the no-answer response to indicate the input question is unanswerable.

4. The method of claim 3, further comprising:
responsive to determining the n-grams and named entities in the input question are not present in the corpus of source information above the predetermined threshold, marking the no-answer response to indicate the corpus of source information does not contain an answer to the input question.

5. The method of claim 1, further comprising:
responsive to determining the no-answer response does not have the highest rank in the candidate answer ranking, determining whether the candidate answer having the highest rank in the candidate answer ranking meets a predetermined confidence threshold; and
responsive to determining the candidate answer having the highest rank does not meet a predetermined confidence threshold, generating a no-answer result that indicates the system is not confident in the candidate answer.

6. The method of claim 1, wherein presenting the no-answer response to the user comprises presenting additional information to differentiate various causes for having no answer.

7. The method of claim 1, wherein annotation engines of the computing system generate features that give weight to or take weight away from the no-answer response.

8. A computer program product comprising a computer readable storage medium having a computer readable program stored therein, wherein the computer readable program, when executed on a computing system, causes the computing system to:
receive an input question from a user;
generate one or more hypotheses based on a corpus of source information;
inject a no-answer response into the one or more hypotheses to form a plurality of candidate answers, wherein the no-answer response is a candidate answer variant representing an absence of an answer;
generate a plurality of features that support the plurality of candidate answers;
perform evidence scoring and confidence scoring on each of the plurality of candidate answers based on the plurality of features to generate a confidence score for each of the plurality of candidate answers including the no-answer response;
rank the plurality of candidate answers, including the no-answer response, based on evidence scoring and confidence scoring to form a candidate answer ranking; and
responsive to determining the no-answer response has a highest rank in the candidate answer ranking, present the no-answer response to the user.

9. The computer program product of claim 8, wherein the computer readable program further causes the computing system to:
parse and analyzing the input question;
responsive to parsing and analyzing the input question resulting in a determination that the input question is incomprehensible, grammatically incoherent, or unsupported by the computing system, generate the no-answer response indicating the question is a bail question; and
present the no-answer response to the user.

10. The computer program product of claim 8, wherein the computer readable program further causes the computing system to:
responsive to determining the no-answer response has the highest rank in the candidate answer ranking, determine whether n-grams and named entities in the input question are present in the corpus of source information above a predetermined frequency threshold; and
responsive to determining the n-grams and named entities in the input question are present in the corpus of source information above the predetermined frequency threshold, mark the no-answer response to indicate the input question is unanswerable.

11. The computer program product of claim 10, wherein the computer readable program further causes the computing system to:
responsive to determining the n-grams and named entities in the input question are not present in the corpus of source information above the predetermined threshold, mark the no-answer response to indicate the corpus of source information does not contain an answer to the input question.

12. The computer program product of claim 8, wherein the computer readable program further causes the computing system to:
responsive to determining the no-answer response does not have the highest rank in the candidate answer ranking, determine whether the candidate answer having the highest rank in the candidate answer ranking meets a predetermined confidence threshold; and
responsive to determining the candidate answer having the highest rank does not meet a predetermined confidence threshold, generate a no-answer result that indicates the system is not confident in the candidate answer.

13. The computer program product of claim 8, wherein presenting the no-answer response to the user comprises presenting additional information to differentiate the various causes for having no answer.

14. The computer program product of claim 8, wherein annotation engines of the computing system generate features that give weight to or take weight away from the no-answer response.

15. An apparatus comprising:
a processor; and
a memory coupled to the processor, wherein the memory comprises instructions which, when executed by the processor, cause the processor to:
receive an input question from a user in a computing system;
generate one or more hypotheses based on a corpus of source information;
inject a no-answer response into the one or more hypotheses to form a plurality of candidate answers, wherein the no-answer response is a candidate answer variant representing an absence of an answer;
generate a plurality of features that support the plurality of candidate answers;
perform evidence scoring and confidence scoring on each of the plurality of candidate answers based on the plurality of features to generate a confidence score for each of the plurality of candidate answers including the no-answer response;
rank the plurality of candidate answers, including the no-answer response, based on evidence scoring and confidence scoring to form a candidate answer ranking; and
responsive to determining the no-answer response has a highest rank in the candidate answer ranking, present the no-answer response to the user.

16. The apparatus of claim 15, wherein the instructions further cause the processor to:
parse and analyzing the input question;
responsive to parsing and analyzing the input question resulting in a determination that the input question is incomprehensible, grammatically incoherent, or unsupported by the computing system, generate the no-answer response indicating the question is a bail question; and
present the no-answer response to the user.

17. The apparatus of claim 15, wherein the instructions further cause the processor to:
responsive to determining the no-answer response has the highest rank in the candidate answer ranking, determine whether n-grams and named entities in the input question are present in the corpus of source information above a predetermined frequency threshold; and
responsive to determining the n-grams and named entities in the input question are present in the corpus of source information above the predetermined frequency threshold, mark the no-answer response to indicate the input question is unanswerable.

18. The apparatus of claim 17, wherein the instructions further cause the processor to:
responsive to determining the n-grams and named entities in the input question are not present in the corpus of source information above the predetermined threshold, mark the no-answer response to indicate the corpus of source information does not contain an answer to the input question.

19. The apparatus of claim 15, wherein the instructions further cause the processor to:
responsive to determining the no-answer response does not have the highest rank in the candidate answer ranking, determine whether the candidate answer having the highest rank in the candidate answer ranking meets a predetermined confidence threshold; and
responsive to determining the candidate answer having the highest rank does not meet a predetermined confidence threshold, generate a no-answer result that indicates the system is not confident in the candidate answer.

20. The apparatus of claim 15, wherein presenting the no-answer response to the user comprises presenting additional information to differentiate the various causes for having no answer.

* * * * *